Nov. 24, 1931.  J. A. RIGGS  1,833,307
DEFREEZING WINDSHIELD WIPER
Filed March 7, 1930    2 Sheets-Sheet 1
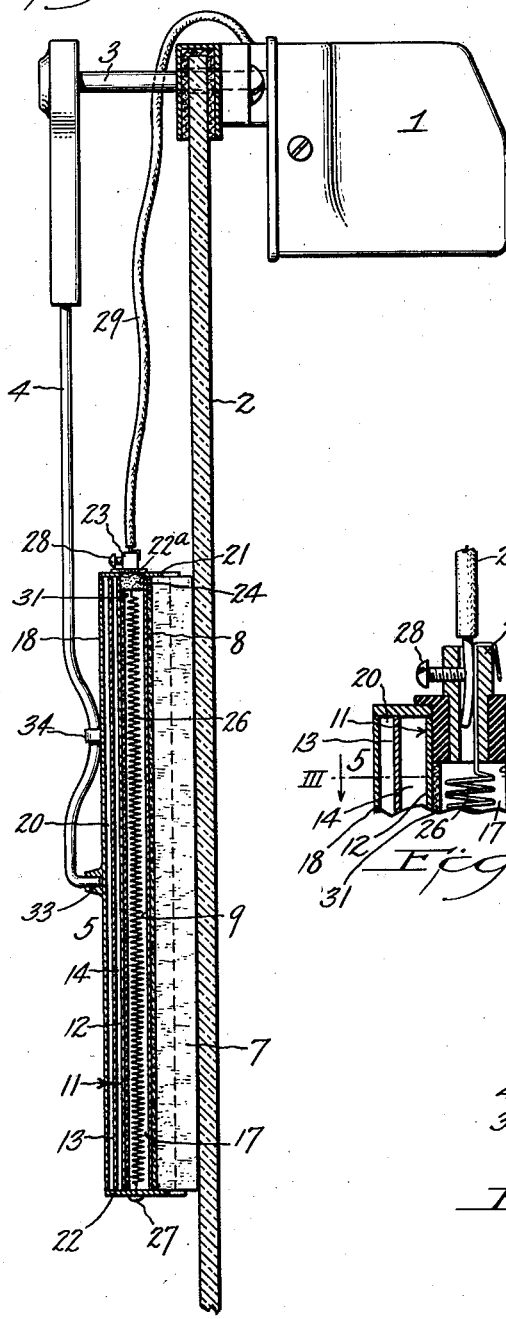
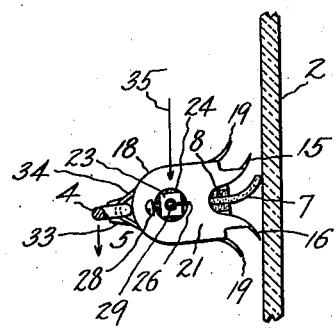
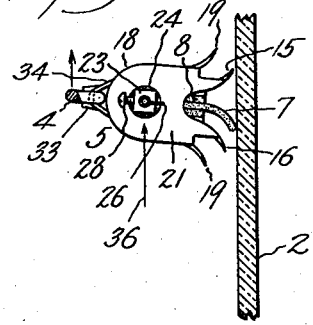
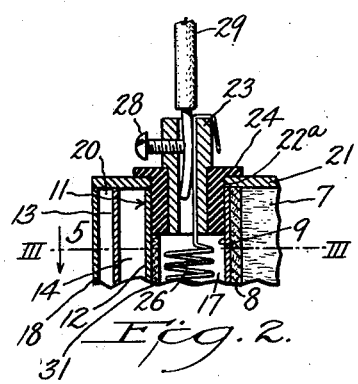
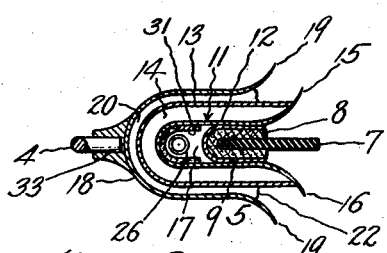
Inventor
J. A. RIGGS
By his Attorneys
Cromwell, Greist & Warden Patented Nov. 24, 1931

1,833,307

UNITED STATES PATENT OFFICE

JAMES ALEXANDER RIGGS, OF SOUTH BEND, INDIANA

DEFREEZING WINDSHIELD WIPER

Application filed March 7, 1930. Serial No. 433,873.

This invention relates to wind-shield wipers and has, as its objects, a wiper embodying improved means whereby not only rain and snow may be wiped off from the wind-shield, but also frozen layers of water or snow may be removed through the action of heating elements suitably combined with the wind-shield wiper to secure efficient defreezing action.

Figure 6:
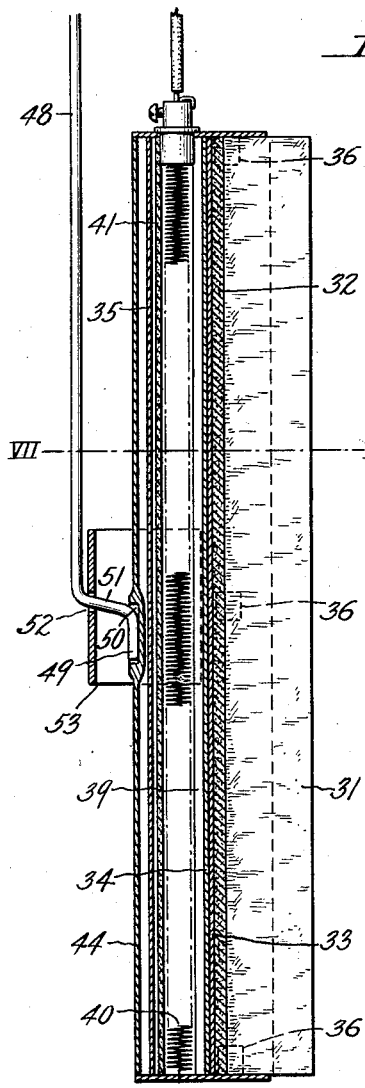
Figure 7:
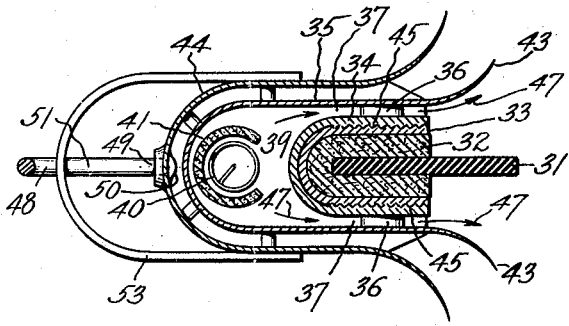
Figure 8:
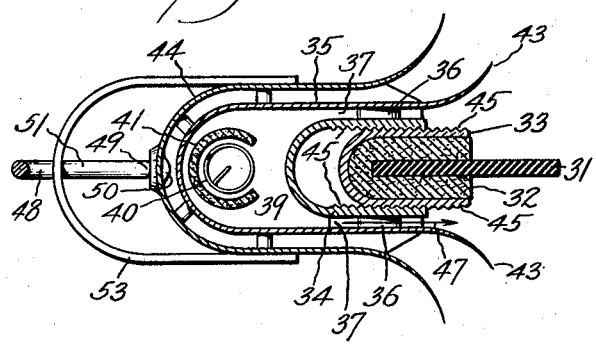
Figure 9:
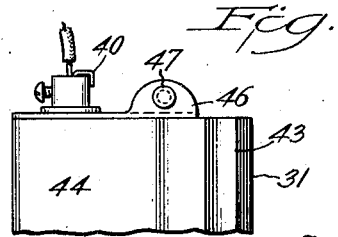

The objects of the invention will be best understood from the following description of an exemplification thereof, reference being had to the accompanying drawings wherein, Fig. 1 is a vertical sectional view of a wind-shield wiper embodying the invention; Fig. 2 is an enlarged sectional detail view of the upper portion of the wiper; Fig. 3 is a horizontal sectional view of the wind-shield wiper along line III—III of Fig. 2; Figs. 4 and 5 are top views of the wind-shield wiper, showing its relative position to the wind-shield during alternate strokes of the wiper; Fig. 6 is a vertical sectional view of a wind-shield wiper embodying a modified form of the invention; Fig. 7 is a horizontal sectional view through the wiper of Fig. 6 along line VII—VII; Fig. 8 is a view similar to Fig. 7 showing the wiper strip in forward position; and Fig. 9 is an elevational view of the top portion of a wiper such as shown in Fig. 6, illustrating a modified construction.

Much trouble is experienced by automobile drivers and also by motormen of electric trains during the winter season on account of ice or layers of frozen snow accumulating on the wind-shield or window in front of the driver, obstructing his vision and making driving not only difficult, but what is much more important, very dangerous to the occupants of the vehicle, as well as to passersby. The ordinary wipers which are effective during warm or normal weather conditions for wiping off rain or wet snow, have no effect whatsoever under cold weather conditions where freezing temperature prevails.

The invention shown in the drawing is a combination of a wind-shield wiper with a defreezing device which is very efficient in melting away ice deposits tending to accumulate on the wind-shield or window in front of the driver. The combined device may be utilized in lieu of ordinary wind-shield wipers without necessitating any elaborate changes in the construction of the wind-shield wiping accessories heretofore used.

In the drawings, the invention is shown applied to an ordinary reciprocating type wind-shield wiper, as generally used on automobiles. The wiper comprises a driving motor 1 of the usual type mounted in the familiar way near the upper edge of glass panel 2, constituting the wind-shield. The motor 1 is provided with an outwardly projecting shaft 3 to which the motor imparts an oscillatory rotary movement. The shaft 3 carries on its end a downwardly projecting holding member or arm 4 in the form of a wire, the arm carrying on its lower end a combined wiper and defreezing unit 5.

The wiper unit comprises a wiper strip 7 of flexible material, such as rubber, having its front edge leaning against the outer side of the glass panel 2 as shown in Figs. 4 and 5. Over the rear edge of the wiper strip is folded a lining strip 8 which is preferably made of heat insulating material, such as an asbestos compound, the lining strip 8 being clamped around the edge of the wiper strip by a U-shaped clamping member 9 of sheet metal, for instance.

The wiper strip 7 with its backing strip 9 is mounted within a U-shaped hollow shield 11 formed of an inner U-shaped sheet-metal member 12 and an outer similarly shaped sheet-metal member 13, so as to provide a hollow space 14 between these U-shaped members. The inner U-shaped member 12 of the shield 11 has its front edges flared outwardly to form two heating fins 15, 16 and the backing strip 9 is mounted at a distance from the closed rear of the member to provide a hollow heater compartment 17 extending throughout the entire length of the wiper strip 7, on the rear thereof. A wind deflector 18, likewise U-shaped, and having outwardly flaring deflecting fins 19, is mounted back of the outer member 13 of the shield 11, preferably spaced therefrom by a gap 20. The several U-shaped strips, namely, backing strip 9, the inner shield member 12, the outer shield member 13 and the deflector 18 may be all of sheet-metal and may be held joined together to form the body as shown in the drawing by means of an upper end plate 21 and a lower end plate 22 of sheet metal that may be soldered or welded at the junctions to the several strips.

The upper end plate 21 has an opening 22ª at a point above the upper end of the longitudinal compartment 17 and in this opening 22ª is mounted a terminal sleeve 23 of conducting material which is held insulated from the U-shaped body of the wiper by a flanged insulating nipple 24. A heating element in the form of helically wound resistance wire 26 extends lengthwise through the longitudinal compartment 17 and is held fixed thereto by a soldered joint at 27 in the bottom plate 22. The upper end of the heater wire extends through the sleeve 23 and is fastened thereto by means of a screw 28 which also serves to fasten the current supply wire 29 having its blank end likewise inserted into the opening of the sleeve 23. Current to the heating coil 26 is supplied through the wire 29 which is connected to one terminal of a current source on the vehicle, for instance, to the insulated terminal of a storage battery, while the other end 27 of the heating coil is connected to a grounded terminal of the current supply through the body of the wiper and its connection by way of the arm 4 to the conducting body of the vehicle. It is understood, of course, that any other form of connection may be used.

As seen in the drawings, particularly in Fig. 3, the forward end of the outer shield member 13 is joined, as by soldering or welding, to the outwardly flaring fins of the inner shield member 12. The inner shield member 12 forms the enclosing casing for the heater coil 26, and the outwardly flaring fins 15 and 16 serve to direct the flow of heat generated by the coil forwardly in the direction of the fins 15, 16 toward the panel 2 of the window shield. The shield 11 is designed with a view to securing unidirectional flow of heat from the heating element 26 toward the heating fins 15 and 16 and to prevent loss of heat on the rear side of the heating element. In the construction shown of the drawing, this heat loss is prevented by reason of the hollow space 14 provided between the inner shield member 12 and outer shield member 13, this space serving as a very efficient heat insulator. In the preferred construction, this space may be evacuated and the vacuum in the space greatly increases the heat insulating effect of the shield and is instrumental in securing good defreezing action by the heating fins with a minimum consumption of heating current. It is understood, of course, that any suitable heat insulating materials may be used for preventing loss of heat on the rear side of the heating element in lieu of the hollow space 14, or the vacuum. However, the hollow construction is very desirable because it secures efficient insulation with a minimum weight and without requiring an excessive size that would cut off much from the field of vision in front of the driver.

The heating element 26 may be made in any of the usual forms, for instance of nichrome wire. Since the encasing walls of the heating element 26 are of metal, it is important to prevent short circuit between the heating element and the walls. This may be secured by either making the heating element so that its surface shall be covered with an insulating oxide film in the way familiar in the art, or by suitable insulating spacers, for instance, a layer 31 of mica folded over the sides and the rear of the heating element 26, serving to electrically insulate the heating coil from the enclosing casing walls, and at the same time reducing the heat flow in the rearward direction. This is a particularly desirable construction as it reduces the heat loss, cuts down the electrical insulating difficulties and permits efficient heating action of the coil in the direction toward the heating fins 15, 16.

The wiper unit 5 may be secured to the arm 4 in the same way as the ordinary wind-shield wiper units are secured to the actuating arms, and as shown in the drawing, the end of the arm 4 is connected to the rear side of the deflector 18 at 33 and also at 34. The mounting of the wiper arm 4 on the end of the motor shaft 3 is made in accordance with standard constructions of wind-shield wipers, the arrangement being such that on the alternate strokes of the arm 4, it is free to slightly tilt in one direction or the other, as shown in Figs. 4 and 5, so as to cause the wiper body to tilt correspondingly, bringing on alternate strokes respectively, heating fins 15 and 16 against the surface of the panel. As shown in the drawings, the arrangement is such that when the wiper moves in a given direction, as indicated by the arrows 35, 36 in Figs. 4 and 5, the wiper strip 7 becomes deflected in opposite direction and the heating fin which lies in the direction of the movement of the wiper leans against the surface of the panel. Thus, as shown in Fig. 4, when the wiper moves in the direction toward the right, heating fin 16 leans against the panel 2, while during the wiper movement in the opposite direction, as shown in Fig. 5, heating fin 15 leans against the panel.

In operation, when the weather is cold and there is a tendency of formation of frozen layers of snow or water on the wind-shield, the wind-shield wiper is started in the usual way, producing a reciprocating oscillatory movement of the wiper movement in the way indicated by Figs. 4 and 5. A switch of any of the usual forms may be included in the circuit of the heating coil 26, the switch being closed when the defreezing action is desired. Heat is thereupon generated by the heating coil and a flow of heat is produced in the direction of the fins 15 and 16 with only small heat loss on account of the insulating action of the hollow shield 11. As the wind-shield wiper moves over the surface of the glass panel, the fins 15 and 16 lean alternately against the panel surface and melt away any ice or snow that froze on the glass, and after a short interval, the ice is removed, the water formed by the melting action being wiped off through the action of the wiper strip 7 which follows on the heels of the heating fins.

As shown in the drawings, the heating fins 15 and 16 are flared outwardly so that they also form scraping edges exercising a mechanical action at the same time as they exercise the heating action. This construction greatly facilitates the removal of ice formations on the wind-shield.

Difficulties are encountered in efficient utilization of the heating action of the heater element 26 due to the action of the wind during the movement of the vehicle, the stream of air flowing against the wind-shield tending to cool the fins 15 and 16. The provision of the deflector 18 greatly increases the efficiency of the wiper and enables effective action of the heating fins 15, 16, notwithstanding the wind action, because the outwardly flared deflector fins 19 deflect the streaming air away from the heating fins 15, 16 so that these heating fins are continuously protected by a layer of warm air filling the space between the fins 19 and 15, 16, thereby avoiding heat loss which would otherwise greatly cut down the effectiveness of the heating fins.

In Figs. 6 to 9, I have shown a wind-shield wiper embodying a modified form of the invention, this construction being extremely simple and highly efficient in practical operation.

The wiper of this construction comprises a wiper unit having a wiper strip 31 of rubber with a folded over lining strip 32 held between the sides of a U-shaped clamping member 33 of sheet metal. The clamping member 33 is adjustably mounted within a U-shaped holder 34 which is in turn held between the sides of the U-shaped backing member 35 by means of spacers 36, so as to provide unobstructed longitudinal communicating spaces 37 on both sides of the holding member 34. Between the back of the holder member 34 and the backing member 35 is provided a hollow heater space 39 in which is mounted an electrical heater coil 40 of nichrome wire or the like in the same way as in the constructions shown in Figs. 1 to 5. The heater coil is partially surrounded by an insulating member 41 which prevents short-circuiting of the heating member due to accidental contact with the adjacent portions of the metallic backing member 35. The insulating member 41 may be made in the form of a trough to serve also as heat insulating means to prevent loss of heat from the heater coil against the closed back of the backing member 35.

The forward ends of the backing member 35 are formed into scraping edges 43 similar to the scraping edges in the constructions shown in Figs. 1 to 5. A wind deflector 44 may also be provided around the backing member.

As shown in the drawings, the outer side of the clamping member 33 and the cooperating inner surfaces of the holding member 34 are knurled or crimped, as shown at 45, so that the wiper strip 31 with its backing member may be adjusted in its forward position with relation to the backing member by pulling it forward or pushing it back towards the rear of the holding member 34. The knurling or crimping is made in such a way that by slight force, the backing member 33 may be pulled forward or pushed backward, the normal engagement between the cooperating crimped or knurled surfaces being sufficient to hold the backing member 33 in the adjusted position while the wiper is operating. Through this arrangement the wiper strip may be either brought to the position shown in Fig. 7 in which the scraping edges 43 engage the surfaces of the panel in the way shown in Figs. 4 and 5 of the drawings on alternate strokes of the wind-shield wiper, or the wiper strip may be pulled forward to the position shown in Fig. 8 in which the wiper strip itself will serve as a spacer holding the scraping edges 43 out of engagement with the surfaces of the panel across which the wiper is operating. Through this adjustable arrangement, the scraping edges may either be brought into action when defreezing of the wind-shield surface is required, or they may be taken out of action under normal or warm weather conditions when no defreezing is required.

In order to permit positive locking of the wiper strip 31 with its clamping member 33 in any of its positions, such as shown in Figs. 7 and 8, lug extensions 46 may be provided at the upper and lower ends of the holding member 34, together with screws 47 for adjustably clamping the opposite lug extensions.

With the arrangements shown in Figs. 6 to 9, the heat generated by the heating coil 40 is conveyed to the surface of the wind-shield, not merely through the action of the scraping fins 43, but also through the direct convection by the currents of heated air flowing from the heating coil by way of the communicating spaces 37 in the direction of the arrows 47. A very efficient defreezing action will be obtained through this arrangement, irrespective of the defreezing action due to the heat conduction by the heating fins 43. With such arrangement, defreezing action will be obtained even if the fins 43 are left out altogether, the current of heated air flowing from the coil 40 by way of the communicating spaces 37 towards the wind-shield surfaces being in many cases by itself sufficient to keep the surface of the wind-shield dry and free from ice accumulations.

In the arrangement shown in Figs. 6 to 8, the windshield wiper unit is held upon the wiper arm 48 by the engagement of the lower offset end 49 of the arm with the depression 50 on the outer rear surface of the backing member 35, the bent portion 51 of the arm being loosely positioned in the hole 52 of a sheet metal loop 53 soldered or otherwise secured to the outer surface of the backing member. The wiper unit may thus be readily removed by merely pulling it off the end of the wiper arm through the hole 52.

By reason of the very efficient heating action of the stream of air flowing from the heater 40 through the spaces 37 towards the wind-shield pannel, the wind deflector 44 may be entirely omitted, the wiper being otherwise constructed as shown in Figs. 6 to 9.

The invention is not limited to the particular details of construction or to any particular type of wiper. For instance, instead of using oscillatory wipers, other wiper movements may be used. Instead of the specific materials referred to above, other materials may be substituted. Many modifications will suggest themselves to those skilled in the art, and it is accordingly desired that the appended claims be given a broad construction commensurate with the scope of the invention within the art.

I claim:

1. In a wiping device for a panel or the like, a wiping strip having a forward edge in engagement with the surface of said panel, an electric heating resistor extending along the rear edge of said wiping strip, a longitudinal U-shaped backing member folded over the rear edge of said wiping strip and constituting an enclosure around said heating resistor, said wiping strip being held between the arms of said U-shaped backing member in front of said heating resistor to provide spaces on the sides of said strip for the flow of heated air from said heating resistor towards said panel, heat insulating means for preventing loss of heat from said heating resistor in a direction away from said panel, and scraping members held on the front ends of said arms for engagement with the surface of said panel incident to the wiping action.

2. In a wiping device for a panel or the like, a wiping strip having a forward edge in engagement with the surface of said panel, an electric heating resistor extending along the rear edge of said wiping strip, a longitudinal U-shaped backing member folded over the rear edge of said wiping strip and constituting an enclosure around said heating resistor, said wiping strip being held between the arms of said U-shaped backing member in front of said heating resistor to provide spaces on the sides of said strip for the flow of heated air from said heating resistor towards said panel, heat insulating means for preventing loss of heat from said heating resistor in a direction away from said panel, scraping members held on the front ends of said arms for engagement with the surface of said panel incident to the wiping action, and means on said backing member for deflecting currents of air flowing against said panel from said scraping edges.

3. In a wiping device for a panel or the like, a wiping strip having a forward edge in engagement with the surface of said panel, an electric heating resistor extending along the rear edge of said wiping strip, a longitudinal U-shaped backing member folded over the rear edge of said wiping strip and constituting an enclosure around said heating resistor, said wiping strip being held between the arms of said U-shaped backing member in front of said heating resistor to provide spaces on the sides of said strip for the flow of heated air from said heating resistor towards said panel, forwardly extending scraping edges on the arms of said backing member for engagement with the surface of said panel incident to the wiping action, and means for adjustably positioning said wiping strip with respect to said backing member to control the engagement of said scraping edges with said panel.

In testimony whereof, I have hereunto subscribed my name this 25th day of February, 1930.

J. ALEX RIGGS.